(12) United States Patent
Colnot

(10) Patent No.: US 10,147,090 B2
(45) Date of Patent: Dec. 4, 2018

(54) VALIDATING A TRANSACTION WITH A SECURE INPUT WITHOUT REQUIRING PIN CODE ENTRY

(71) Applicant: NXP B.V., Eindhoven (NL)

(72) Inventor: Cedric Colnot, Leuven (BE)

(73) Assignee: NXP B.V., Eindhoven (NL)

( * ) Notice: Subject to any disclaimer, the term of this patent is extended or adjusted under 35 U.S.C. 154(b) by 1549 days.

(21) Appl. No.: 13/632,932

(22) Filed: Oct. 1, 2012

(65) Prior Publication Data

US 2014/0095388 A1    Apr. 3, 2014

(51) Int. Cl.
*G06Q 20/38* (2012.01)
*G06Q 20/40* (2012.01)
*G06Q 20/42* (2012.01)

(52) U.S. Cl.
CPC ....... *G06Q 20/385* (2013.01); *G06Q 20/4014* (2013.01); *G06Q 20/425* (2013.01)

(58) Field of Classification Search
CPC ............ G07F 19/00; H04L 9/00; G06Q 20/40
USPC .............................. 235/379; 713/184; 705/71
See application file for complete search history.

(56) References Cited

U.S. PATENT DOCUMENTS

| | | | |
|---|---|---|---|
| 5,280,592 A | 1/1994 | Ryba et al. | |
| 5,339,417 A | 8/1994 | Connell et al. | |
| 5,724,424 A | 3/1998 | Gifford | |
| 6,092,202 A | 7/2000 | Veil et al. | |
| 6,976,090 B2 | 12/2005 | Ben-Shaul et al. | |
| 8,052,049 B1 | 11/2011 | Doland et al. | |
| 8,707,056 B2 | 4/2014 | Felton | |
| 2002/0029342 A1* | 3/2002 | Keech | G06Q 20/02 713/184 |
| 2003/0079127 A1 | 4/2003 | Bidan et al. | |
| 2003/0114152 A1 | 6/2003 | Gibbs et al. | |
| 2004/0192434 A1 | 9/2004 | Walker et al. | |
| 2005/0182952 A1 | 8/2005 | Shinozaki | |
| 2005/0278544 A1 | 12/2005 | Baxter | |
| 2006/0136717 A1 | 6/2006 | Buer et al. | |
| 2006/0195907 A1 | 8/2006 | Delfs et al. | |
| 2006/0287963 A1 | 12/2006 | Steeves et al. | |
| 2007/0069008 A1* | 3/2007 | Klein | G06Q 20/40 235/379 |
| 2008/0209212 A1 | 8/2008 | Ditzman et al. | |
| 2009/0144558 A1 | 6/2009 | Wang | |
| 2009/0307139 A1 | 12/2009 | Mardikar et al. | |

(Continued)

FOREIGN PATENT DOCUMENTS

| | | |
|---|---|---|
| CN | 1561508 A | 1/2005 |
| CN | 101840548 A | 9/2010 |

(Continued)

OTHER PUBLICATIONS

Chinese Office Action mailed Jun. 2, 2016 for 201310454721.5.
Chinese Office Action mailed May 4, 2016 for 201310454740.8.
Office Action mailed Mar. 9, 2016, in U.S. Appl. No. 13/632,907.
European Communication for EP 13186761.6 dated Jan. 7, 2014 with European Search Report Dec. 9, 2013.

(Continued)

*Primary Examiner* — Calvin L Hewitt, II
*Assistant Examiner* — Nakia Leffall-Allen

(57) ABSTRACT

A method for secure transactions on a mobile handset or tablet equipped with a touch screen controlled by a secure processor such as a master secure element or Trusted Execution Environment having gesture recognition capabilities. Since the touch screen is fully controlled by the secure processor, the user can securely enter the transaction amount using gestures to validate the transaction.

19 Claims, 4 Drawing Sheets

(56) References Cited

U.S. PATENT DOCUMENTS

| | | | |
|---|---|---|---|
| 2010/0107238 A1 | 4/2010 | Stedman et al. | |
| 2011/0119141 A1 | 5/2011 | Hoyos | |
| 2011/0240728 A9 | 10/2011 | Arnouse | |
| 2011/0251954 A1 | 10/2011 | Chin | |
| 2012/0178366 A1 | 7/2012 | Levy et al. | |
| 2014/0040147 A1* | 2/2014 | Varadarajan | H04L 63/0853 705/71 |
| 2014/0095387 A1 | 4/2014 | Colnot | |
| 2014/0096222 A1 | 4/2014 | Colnot | |
| 2015/0056957 A1 | 2/2015 | Mardikar et al. | |

FOREIGN PATENT DOCUMENTS

| | | |
|---|---|---|
| CN | 102143482 A | 8/2011 |
| EP | 2 365 469 A1 | 9/2011 |
| FR | 2814880 A1 | 4/2005 |
| WO | 01/17310 A1 | 3/2001 |
| WO | 2007/129345 A1 | 11/2007 |
| WO | 2010/002541 A1 | 1/2010 |
| WO | 2011/051757 A1 | 5/2011 |

OTHER PUBLICATIONS

"The Trusted Execution Environment: Delivering Enhanced Security at a Lower Cost to the Mobile Market", GlobalPlatform, 26 pgs., retrieved from the Internet at: http://www.globalplatform.org/mediawhitepapers.asp (Feb. 2011).

Yang, B. et al. "Secure Scan: A Design-for-Test Architecture for Crypto Chips", IEEE Transactions on Computer-Aided Design of Integrated Circuits and Systems, vol. 25, No. 10, pp. 2287-2293 (Oct. 2006).

Gorbet, M. G. et al. "Triangles: Design of a Physical/Digital Construction Kit", Mit Media Lab, 4 pgs, retrieved from the internet at: tmg-trackr.media.mit.edu/publishedmedia/...Triangles%20Design%20of%20a/.../PDF (Aug. 18, 1997).

Extended European Search Report for Patent Appln. No. 13186761.6 (dated Jan. 7, 2014).

Extended European Search Report for Patent Appln. No. 13186672.5 (dated Dec. 16, 2013).

Extended European Search Report for Patent Appln. No. 13186715.2 (dated Jan. 30, 2014).

Office Action from related EP patent appln. No. 13186672.5 (dated Sep. 17, 2018).

\* cited by examiner

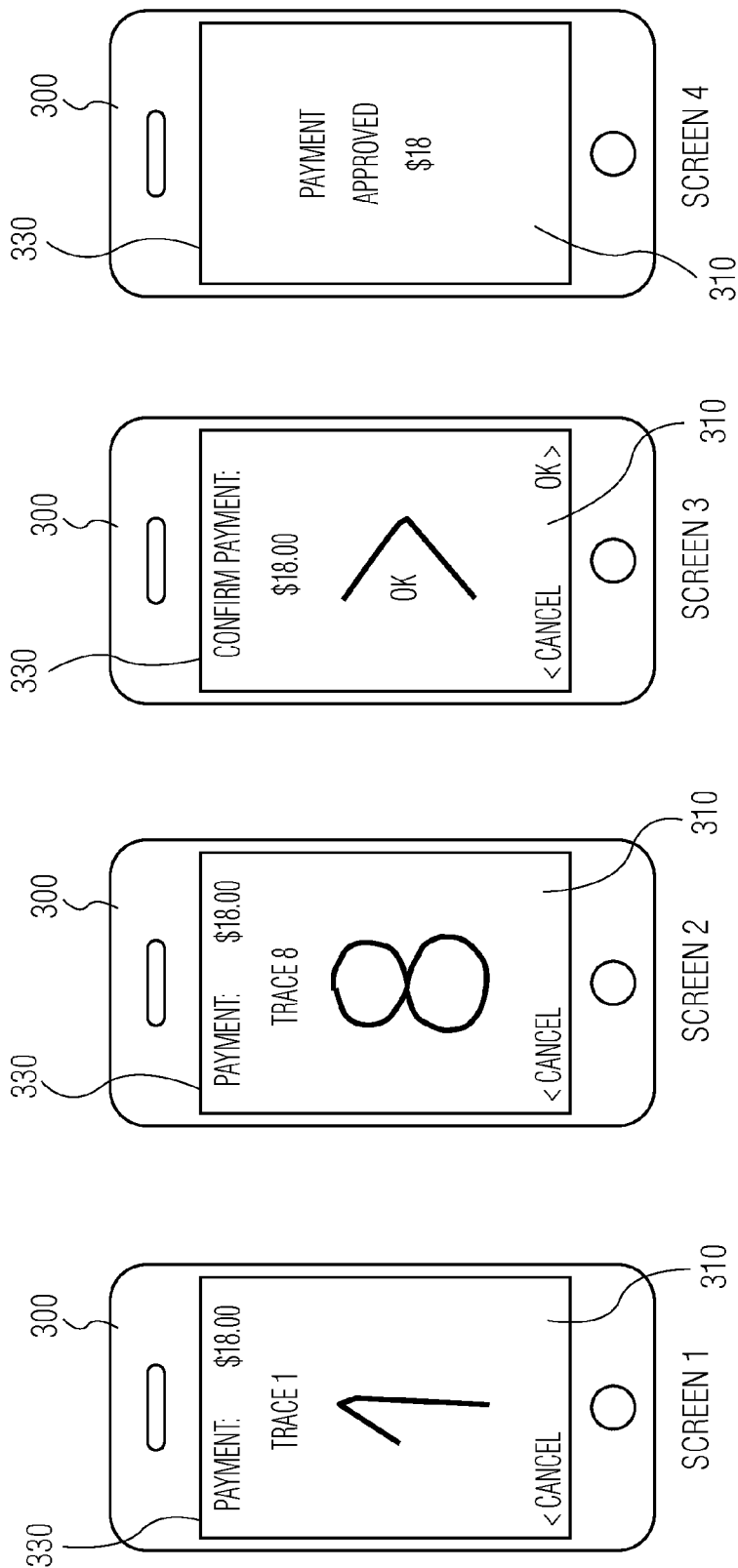

VALIDATING A TRANSACTION WITH A SECURE INPUT WITHOUT REQUIRING PIN CODE ENTRY

Related application "Secure User Authentication using a Master Secure Element", Ser. No. 13/632,870 filed on the same day and assigned to the same assignee is incorporated by reference herein in its entirety. Related application "Validating a Transaction with a Secure Input and a Non-Secure Input", Ser. No. 13/632,907 filed on the same day and assigned to the same assignee is incorporated by reference herein in its entirety.

BACKGROUND

Mobile platforms or connected devices such as smart phones, personal computers, tablet PCs are integrating a secure element to authenticate the platform, to protect user credentials or to secure transactions. The secure element is typically a highly tamper resistant device that provides a secure execution environment isolated from the host processor. The secure element may be integrated into various form factors such as, for example, SIM cards, SD cards, or small outline packages attached directly on the printed circuit board (embedded secure element) and is especially useful for payment applications such as bank cards, mobile wallets and the like.

A payment transaction often requires the authentication of the user to either activate the application or to validate the transaction. A payment transaction is usually performed on a secure terminal with trusted user interfaces (i.e. secure display and keypad) for added security. In the typical mobile handset type architecture, a user enters their PIN code or activates the confirmation button located directly on the handset keypad. The entry of the PIN code or the activation of the confirmation button is typically handled by the host processor which operates in a non-secure and open environment. Because mobile handsets are typically connected to a network, the handsets can be infected by malware that can operate to intercept the entered PIN code or cause an invalid transaction to be confirmed.

Typical transaction validation involves two factors: 1) the application needs to be assured that only the user can validate the transaction; 2) the user needs to be assured that only the transaction the user accepts is completed. However, requiring entry of a PIN code to validate each transaction may be seen as user unfriendly and not very secure as the more times a PIN code is entered the greater the chance of it being observed and stolen.

BRIEF DESCRIPTION OF THE DRAWINGS

FIGS. 3a-d show an embodiment in accordance with the invention.

DETAILED DESCRIPTION

Smart phones and tablets equipped with relatively large touch screens are becoming ever more common. Users are becoming increasingly familiar with the tactile and intuitive nature of touch screen interfaces. Gestures such as the "spread", "pinch", "rotate", "flick" and others are standardized motions for interacting with multi-touch devices and are typically improving the user experience in many ways.

In an embodiment in accordance with the invention, transactions on a mobile handset, PC, tablet or similar device having a touch screen may be secured if the touch screen is controlled by a master secure element embedding gesture recognition capability.

Figure 1:
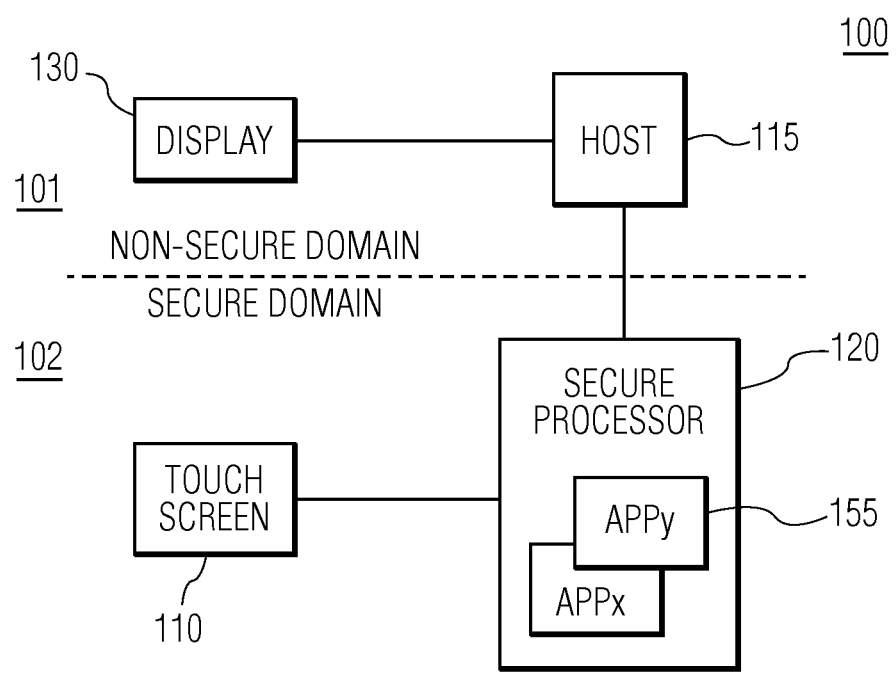
FIG. 1 shows an embodiment in accordance with the invention.

Related application "Secure User Authentication using a Master Secure Element", referenced above, describes an exemplary embodiment where master secure element 120 is used as a secure processor and controls user input into the handset keypad (or touch screen) 110 to secure the user authentication based on, for example, the entry of a PIN code (see FIG. 1). The basic idea is that transaction validation can be accomplished by a secure processor that controls the user input but not the output. Using a master secure element is one embodiment of secure processor 120. The TEE is essentially a virtual secure processor. Using the TEE as secure processor 120 as discussed above in place of a master secure element is typically a less secure embodiment but also an embodiment in accordance with the invention.

FIG. 1 shows secure handset architecture 100 in accordance with the invention. Secure Processor (SP) 120 controls user input into secure touch screen 110 to provide user authentication based on gestures. However, SP 120 does not control non-secure display 130 which remains in non-secure domain 101 where it is controlled by host processor 115 while touch screen 110 resides in secure domain 102 where it is controlled by SP 120. In accordance with the invention, a user closes the loop between non-secure display 130 controlled by host processor 115 and secure touch screen 110 controlled by SP 120. Note that non-secure display 130 is typically stacked directly below secure touch screen 110 so that it is visible through touch screen 110.

The user validates a transaction by tracing on secure touch screen 110 the transaction amount digit by digit with their finger or a suitable stylus, for example. The traced digits are then verified individually by SP 120 (before the user validates the transaction by inputting ">").

Figure 2A:
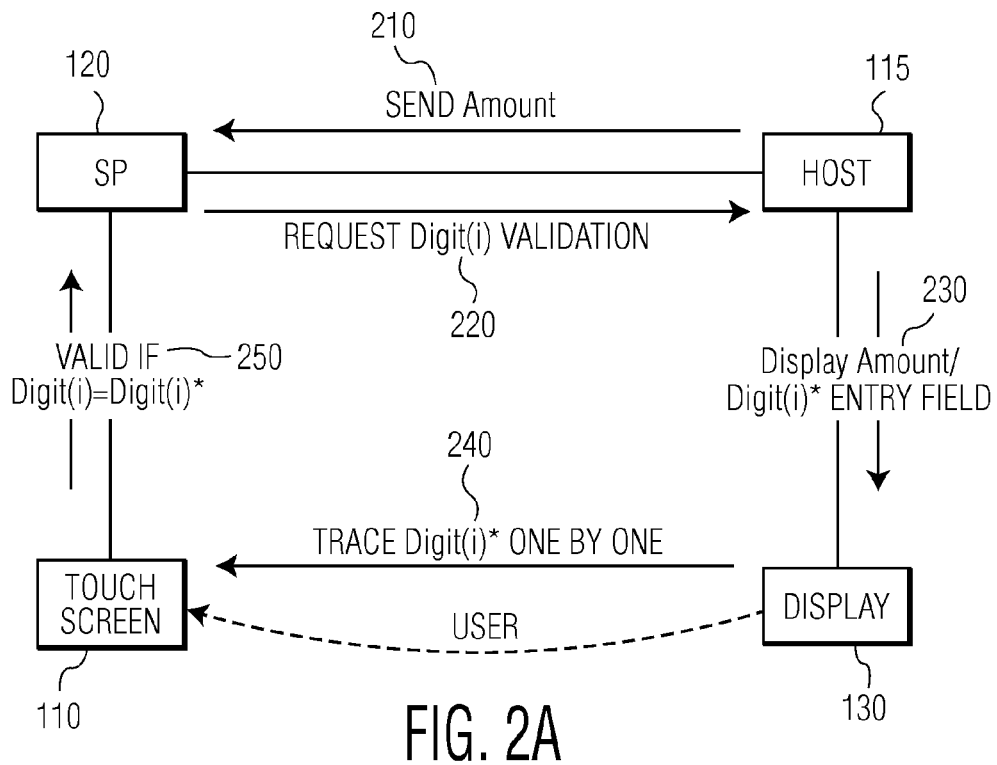
FIG. 2a shows an embodiment in accordance with the invention.

FIG. 2a shows an embodiment in accordance with the invention. In step 210 of FIG. 2a, host processor 115 sends the "Amount" related to the transaction to master secure element 120. In step 220, SP 120 requests digit validation from host 115. This causes host 115 to display the "Amount" and the digit entry field on non-secure display 130 in step 230. In step 240, the user traces the transaction amount digit by digit on secure touch screen 110 which overlays non-secure display 130. In step 250, SP 120 compares the digits traced by the user on touch screen 110 digit by digit with the "Amount" sent by host 115 to SP 120 in step 210. If the digit by digit comparison does not indicate a match, the transaction is aborted.

If malware running on host processor 115 is able to manipulate the transaction amount sent to SP 120, it will be detected in step 250. If the transaction amount displayed on non-secure display 130 is not correct, the transaction is cancelled by the user in step 240. The transaction is validated because only the user is able to enter the amount that the user agrees to.

Figure 2B:
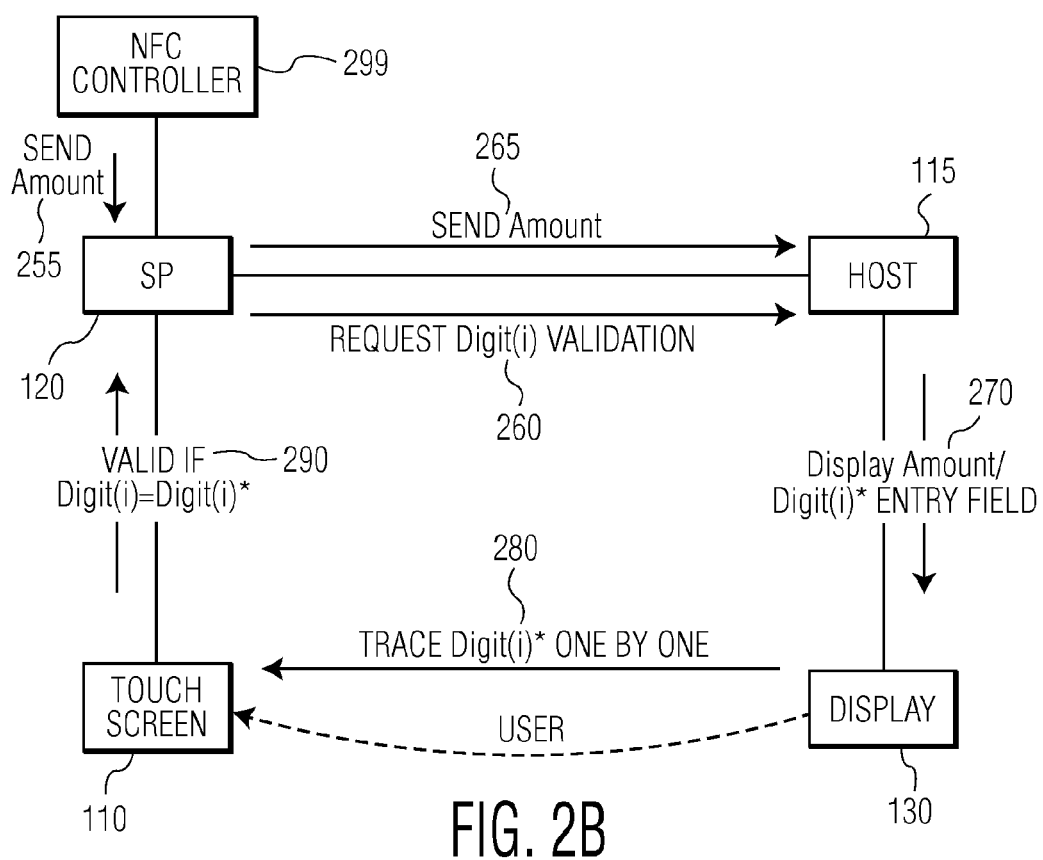
FIG. 2b shows an embodiment in accordance with the invention.

Note that for embodiments in accordance with the invention, it is not necessary for the transaction amount data to originate from host processor 115. It may also come from another device directly connected to SP 120 such as a near field communications (NFC) controller 299 as shown in FIG. 2b if the mobile handset, PC, tablet or similar device is NFC enabled, for example. However, the transaction amount is still communicated to host processor 115 for validation by the user.

FIG. 2b shows an embodiment in accordance with the invention. In step 255, NFC controller 299 sends "Amount" related to the transaction to SP 120. In step 260, SP 120 requests digit validation from host 115 and in step 265 sends "Amount" to host 115. This causes host 115 to display the "Amount" and the digit entry field on non-secure display 130 in step 270. In step 280, the user traces the transaction amount digit by digit on secure touch screen 110 which overlays non-secure display 130. In step 290, SP 120 compares the digits traced by the user on touch screen 110 digit by digit with the "Amount" sent by NFC controller 299 to master secure element in step 250. If the digit by digit comparison does not indicate a match, the transaction is aborted.

FIGS. 3a-d show the typical transaction validation flow for an embodiment in accordance with the invention. In FIG. 3a, the "Amount" or "Payment" on non-secure display 330 of smart phone 300 is $18.00 and host 115 via display 330 indicates that the number "1" on display 330 is to now be traced by the user on touch screen 310 overlying display 330. In FIG. 3b, host 115 via display 330 indicates that number "8" is now to be traced by the user on overlying touch screen 310. In FIG. 3c, host 115 via display 330 requests the user to confirm payment of $18.00 by tracing the ">" symbol on touch screen 310 overlying display 330. Note, the user may still cancel the transaction by inputting "<" which can also function as a backspace. In FIG. 3d, host 115 via display 330 indicates that for this transaction no validation problem occurred and the payment of $18.00 was approved. In an embodiment in accordance with the invention, the digits need not be presented individually but could be presented two or more at a time for tracing by the user.

In an embodiment in accordance with the invention, the user only needs to trace with their finger or a suitable stylus the digits drawn on non-secure display 330 on overlying touch screen 310 corresponding to the transaction amount. Each digit employs a single-stroke gesture inspired by the UNISTROKES shorthand technology developed by XEROX and developed by Palm as GRAFFITI in the 1990's. Unlike UNISTROKES, only 12 symbols (representing numbers 0-9, cancel "<" and ok ">") are used which the user does not need to learn because host 115 presents them to the user via display 330 for tracing on overlying touch screen 310. Symbol recognition by SP 120 is computationally simplified because only the small set of symbols used (12 in one embodiment in accordance with the invention) and because SP 120 "knows" the symbol to be entered by the user.

Figure 4:
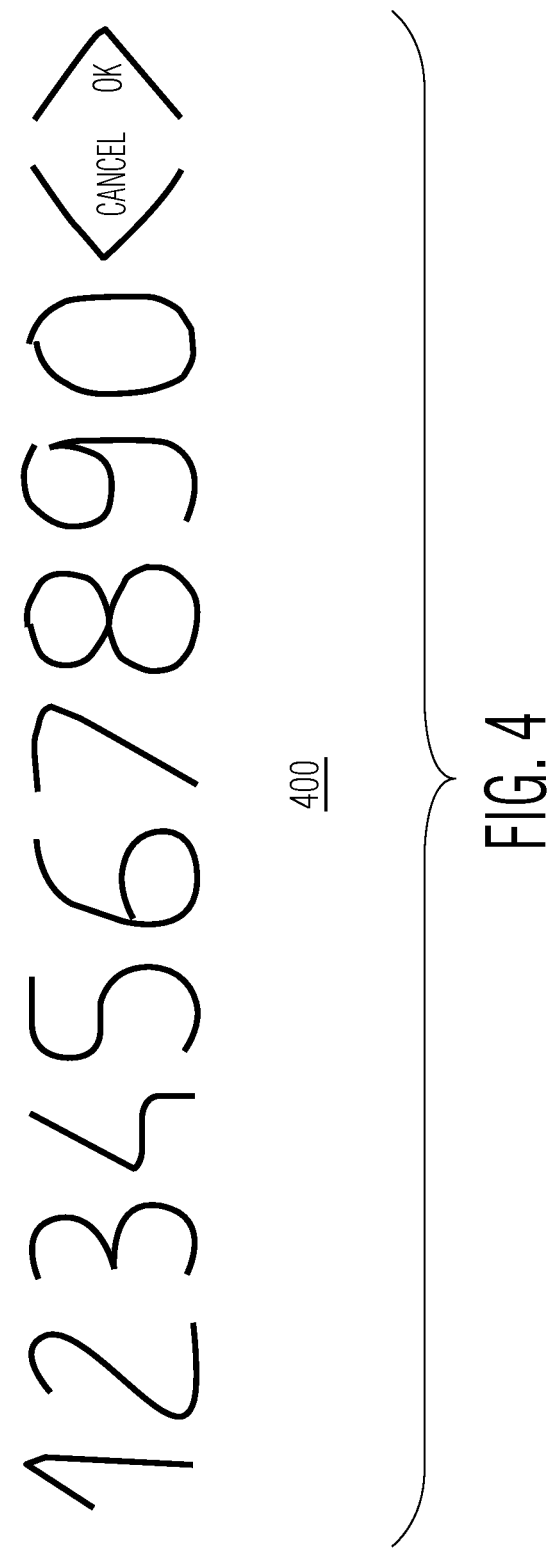
FIG. 4 shows the symbol set for an embodiment in accordance with the invention.

FIG. 4 shows a UNISTROKE inspired symbol set 400 of 12 symbols in an embodiment in accordance with the invention. Because touch screen 310 is connected directly and in direct communication with SP 120 and symbol set 400 is small, an embodiment in accordance with the invention can be used to unlock a smart phone, a tablet, a PC or similar touch screen enabled device. However, unlike the transaction amount, the PIN code is not drawn on display 330 by host processor 115 (complicating entry) and the user would need to be away from prying eyes to enter the PIN code. Symbol recognition is not an issue as SP 120 knows the user's PIN code. However, the use of a PIN code not drawn on display 330 for tracing may require a more powerful secure processor to run more complex software that can recognize variations in the entered symbols. The PIN code need not be verified directly by SP 120. For online transactions, for example, the PIN code entered by the user may be encrypted by SP 120 and sent to a back end server for authentication. Transaction data such as amount, card number or expiration date may be either encrypted together with the PIN code or encrypted separately when communicated to a back end server.

Whether the symbol is displayed by host processor 115 on display 330 or not, the shape the user needs to enter on touch screen 310 is always known by SP 120. Hence, symbol recognition does not necessarily require an initialization training phase by the user. However, a recognition system that is part of SP 120 can record physical data such as, for example, shape, size or speed related to the way an individual user draws the symbols of symbol set 400. This recording of physical data allows a biometric recognition of the user based on statistics. The confidence level increases with each transaction as the recognition system gathers more data. In the event that SP 120 does not recognize the user, SP 120 can request the entry of the users PIN code on a keypad as described in related application "Validating a Transaction with a Secure input and a Non-Secure Output" incorporated by reference above.

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

The invention claimed is:

1. A method for validating a transaction using a secure handset having a host processor, a secure processor, a non-secure display and a secure touch screen, the method comprising the step of:
   sending, by the host processor, a transaction amount comprising digits from the host processor to the secure processor;
   sending, by the secure processor, a request for amount validation from the secure processor to the host processor;
   displaying, by the host processor, the transaction amount on the non-secure display of the host processor to a user;
   receiving, by the host processor, from the user, a trace of the transaction amount digit by digit on the secure touch screen which overlays the non-secure display;
   sending, by the host processor, the trace of the transaction amount from the secure touch screen to the secure processor;
   comparing, by the secure processor, the digits traced by the user on the secure touch screen with the transaction amount sent by the host processor to the secure processor; and
   validating, by the secure processor, the transaction based upon the respective digits match.

2. The method of claim 1, further comprising:
   accepting, by the secure processor, the trace of the transaction amount as input on the secure touch screen indicating completion of the input.

3. The method of claim 1, further comprising,
   accepting, by the secure processor, the input on the secure touch screen as representing secret data in order to authenticate the user.

4. The method of claim 1, wherein the input are single stroke gestures.

5. The method of claim 3, wherein the secret data is a PIN code.

6. The method of claim 1, wherein the secure processor is a master secure element.

7. The method of claim 1, wherein the secure processor is a Trusted Execution Environment.

8. The method of claim 3, wherein authentication of the secret data is performed by a back end server.

9. A method for validating a transaction using a secure handset having a host processor, a secure processor, a non-secure display and a secure touch screen, the method comprising the step of:
    sending, by the secure processor, a transaction amount comprising digits from a device;
    sending, by the secure processor, a request for amount validation from the secure processor to the host processor;
    displaying, by the host processor, the transaction amount on the non-secure display to a user;
    receiving, by the host processor, from the user, a trace of the transaction amount digit by digit on the secure touch screen which overlays the non-secure display;
    sending, by the host processor, the trace of the transaction amount from the secure touch screen to the secure processor;
    comparing, by the secure processor, the digits traced by the user on the secure touch screen with the transaction amount sent by the host processor to the secure processor; and
    validating, by the secure processor, the transaction based upon the respective digits match.

10. The method of claim 9, further comprising:
    accepting, by the secure processor, the trace of the transaction amount as input the secure touch screen indicating completion of the input.

11. The method of claim 9, further comprising:
    accepting, by the secure processor, the input on the secure touch screen as representing secret data in order to authenticate a user.

12. The method of claim 9, wherein the input is single stroke gestures.

13. The method of claim 11, wherein the secret data is a PIN code.

14. The method of claim 9, wherein the device is a Near Field Communications controller.

15. The method of claim 11, wherein authentication of the secret data is performed by a back end server.

16. The method of claim 9, wherein the secure processor is a master secure element.

17. The method of claim 16, wherein the device is a Near Field Communications controller.

18. The method of claim 9, wherein the secure processor is a Trusted Execution Environment.

19. The method of claim 18, wherein the device is a Near Field Communications controller.

* * * * *